United States Patent
Shalaby et al.

(10) Patent No.: US 9,476,713 B2
(45) Date of Patent: Oct. 25, 2016

(54) RING MIRROR OPTICAL ROTATION SENSOR

(71) Applicants: Si-Ware Systems, Cairo (EG); King Abdulaziz City for Science and Technology, Riyadh (SA)

(72) Inventors: Mohamed Yehia Shalaby, Cairo (EG); Kamal Mohammed Khalil Abdel Salam, Giza (EG); Abdelrahman Emad El-Deen Hussien Mohammed Afifi, Cairo (EG); Diaa Abdel Maged Khalil, Cairo (EG); Khaled Hassan Mohamed Ahmed, Cairo (EG); Faris Saad Alarifi, Riyadh (SA); Mohammed Jary Al-Otaibi, Riyadh (SA)

(73) Assignees: KING ABDULAZIZ CITY FOR SCIENCE AND TECHNOLOGY, Riyadh (SA); SI-WARE SYSTEMS, Cairo (EG)

( * ) Notice: Subject to any disclaimer, the term of this patent is extended or adjusted under 35 U.S.C. 154(b) by 73 days.

(21) Appl. No.: 14/481,137

(22) Filed: Sep. 9, 2014

(65) Prior Publication Data
US 2015/0070706 A1  Mar. 12, 2015

Related U.S. Application Data

(60) Provisional application No. 61/875,833, filed on Sep. 10, 2013.

(51) Int. Cl.
*G01C 19/72* (2006.01)
*G01C 19/66* (2006.01)
*G01C 19/68* (2006.01)

(52) U.S. Cl.
CPC .............. *G01C 19/66* (2013.01); *G01C 19/68* (2013.01)

(58) Field of Classification Search
CPC ...... G01C 19/66; G01C 19/68; G01C 19/72; G01C 19/722; G01C 19/726
USPC ........................................ 356/459, 460, 465
See application file for complete search history.

(56) References Cited

U.S. PATENT DOCUMENTS 5,453,836 A    9/1995 Kim et al.
5,555,088 A *  9/1996 Valette ................ G01C 19/722
                                                  356/465

(Continued)

OTHER PUBLICATIONS

Hong, Jong Bum, et al. "Phase sensitive detection for mode-locked fiber laser gyroscope." Photonics Technology Letters, IEEE 11.8 (1999): 1030-1032.
Jeon, M. Y., H. J. Jeong, and B. Y. Kim. "Mode-locked fiber laser gyroscope." Optics letters 18.4 (1993): 320-322.

(Continued)

*Primary Examiner* — Tarifur Chowdhury
*Assistant Examiner* — Jonathon Cook
(74) *Attorney, Agent, or Firm* — Loza & Loza, LLP; Holly L. Rudnick

(57) ABSTRACT

An optical rotation sensor includes a Fabry Perot laser having an active gain medium for generating first and second light beams, a closed optical path through which the first and second light beams counter-propagate and first and second mirrors coupled to respective ends of the closed optical path. The first minor is a ring mirror having a complex valued reflectivity that varies with a rotation rate of a frame within which the optical rotation sensor is placed. A detector is coupled to an output of the Fabry Perot laser to measure an output intensity thereof.

21 Claims, 6 Drawing Sheets

(56) References Cited

U.S. PATENT DOCUMENTS

| | | | | |
|---|---|---|---|---|
| 5,969,816 | A | * | 10/1999 | Kim .................. G01C 19/64 356/460 |
| 6,377,351 | B1 | | 4/2002 | Kim et al. |
| 2010/0302548 | A1 | * | 12/2010 | Digonnet ............ G01C 19/721 356/465 |
| 2013/0083327 | A1 | * | 4/2013 | Khalil ................. G01C 19/70 356/460 |

OTHER PUBLICATIONS

Lee, Bong Wan, Ho Jin Jeong, and Byoung Yoon Kim. "High-sensitivity mode-locked fiber laser gyroscope." Optics letters 22.2 (1997): 129-131.

Park, Kyung Hyun, et al. "Mode-locked fiber laser gyroscope based on a distributed-feedback semiconductor laser amplifier." Optics letters 21.1 (1996): 92-94.

\* cited by examiner

RING MIRROR OPTICAL ROTATION SENSOR

CROSS REFERENCE TO RELATED PATENTS

The present U.S. Utility Patent Application claims priority pursuant to 35 U.S.C. §119(e) to the following U.S. Provisional Patent Application, which is hereby incorporated herein by reference in its entirety and made part of the present U.S. Utility Patent Application for all purposes:

U.S. Provisional Application Ser. No. 61/875,833, entitled "Ring Minor Optical Rotation Sensor (RMORS)," filed Sep. 10, 2013, pending.

BACKGROUND OF THE INVENTION

1. Technical Field of the Invention

The present invention relates in general to optical rotation sensors, and in particular to optical rotation sensors with higher sensitivity and reduced lock-in.

2. Description of Related Art

An Optical Rotation Sensor (ORS) is an instrument used to measure the angular rotation rate of a certain platform. The two main well-known configurations of ORS's are the Ring Laser Gyroscope (RLG) and the Fiber Optical Gyroscope (FOG).

An RLG typically includes a laser system designed and fabricated to work in a ring configuration. The most familiar form of an RLG is built using a helium-neon (HN) ring laser with a diameter in the range of 30 cm. The operating principle of an RLG is based on the beating between two counter propagating beams of light in the ring laser cavity.

An FOG typically includes a wide-spectrum source, such as an SLED, connected to a fiber coil through a 50/50 directional coupler. The fiber coil is turned in a ring shape to form a ring mirror with a variable reflection coefficient according to the rotation rate.

At stationary state, the two beams in an ORS travel the same distance around the cavity, and thus have the same phase shift. When the system is rotated with a certain specific angular rotation rate, one beam experiences a larger distance around the cavity than the other due to the Sagnac effect, and as a result, the two beams are generated at two different wavelengths (in the case of an RLG) or the reflection coefficient changes according to the rotation rate (in the case of an FOG). The optical path difference between the two beams is directly proportional to the rotation rate of the cavity or the minor, and similarly, the optical frequency difference or the minor reflection coefficient. Such a difference can be detected as a beating frequency between the two waves propagating in the ring laser in the clockwise (CW) and counter clockwise (CCW) directions in RLGs or as an amplitude modulation of the intensity (i.e., change in DC values from the detector) in FOGs.

One of the main problems in RLG systems is coupling and lock-in between the two propagating beams at low rotation rates. Due to the nature of the optical cavity, a scattering mechanism takes place at the reflector interfaces. Such scattering causes energy to be coupled from the CW beam to the CCW beam and vice-versa. This coupling can cause the two beams to be pulled to the same frequency in a phenomenon called mode lock-in, which seriously limits the sensitivity of RLG devices. Another challenge in RLG instruments is determining the direction of rotation of the platform. Therefore, there is a need for an improved ORS with reduced lock-in.

SUMMARY OF THE INVENTION

Embodiments of the present invention provide an optical rotation sensor including a Fabry Perot laser having an active gain medium for generating first and second light beams, a closed optical path through which the first and second light beams counter-propagate and first and second minors, each coupled to a respective end of the closed optical path. The first mirror is a ring minor that has a complex valued reflectivity that varies with a rotation rate of a frame within which the optical rotation minor is placed. The optical rotation sensor further includes a detector coupled to an output of the Fabry Perot laser to measure an output intensity thereof.

In one embodiment, the ring mirror further includes a waveguide loop having two ends and an optical coupler having a first side coupled to the two ends of the waveguide loop and a second side coupled to the active gain medium and the detector. The waveguide loop may be, for example, a fiber loop that includes a single mode fiber coil or a polarization maintaining fiber coil. In an exemplary embodiment, the complex valued reflectivity of the ring mirror has a phase that is dependent upon the length of the waveguide loop and an amplitude that is dependent upon the rotation rate of the frame. In addition, the intensity of the Fabry Perot laser at the output of the ring minor varies in relation to the rotation rate.

In another embodiment, the ring minor includes a ring resonator and an optical coupler having a first side coupled to the ends of the ring resonator and a second side coupled to the active gain medium and the detector.

In further embodiments, the second mirror can be a high reflection minor, metallic minor or a coated end of a fiber. In still further embodiments, the second mirror is a second ring mirror. In an exemplary embodiment, the second ring mirror includes a second waveguide loop and a second optical coupler having a first side coupled to the ends of the second waveguide loop and a second side coupled to the active gain medium. In another exemplary embodiment, the second ring minor includes a second ring resonator and a second optical coupler having a first side coupled to the ends of the second ring resonator and a second side coupled to the active gain medium.

In another embodiment, the ring mirror includes a phase modulator coupled between one of the two ends of the waveguide loop or ring resonator and the optical coupler. In still another embodiment, the second ring minor also includes a phase modulator coupled between one of the two ends of the second waveguide loop or second ring resonator and the second optical coupler. In an exemplary embodiment, one or more of the phase modulators includes a moveable corner minor and a Micro-Electro-Mechanical Systems (MEMS) actuator coupled to the moveable corner minor to cause a respective displacement thereof that induces a phase modulation on the first and second light beams relative to one another. In a further embodiment, the optical rotation sensor further includes a MEMS die having the corner mirror(s), MEMS actuator(s) and active gain medium thereon.

In still a further embodiment, the ring minor is an integrated optical ring mirror, the waveguide loop is an integrated optical waveguide loop and the optical coupler is an integrated optical coupler. In an exemplary embodiment, the optical rotation sensor further includes a single substrate having the integrated optical ring mirror including the integrated optical waveguide and the integrated optical coupler thereon. In another exemplary embodiment, the active gain medium includes a waveguide amplifier, the second mirror is a metallized end of a waveguide or a dielectric mirror optically coupled to the waveguide and the single substrate has the integrated optical ring mirror, the waveguide amplifier and the waveguide thereon.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a ring mirror is inserted as a mirror of a Fabry Perot laser cavity to produce an optical rotation sensor, referred to herein as a ring mirror optical rotation sensor (RMORS). The Fabry Perot laser cavity includes an active gain medium and is formed between the ring mirror and another mirror, which can be another ring mirror or any other type of mirror. The Fabry Perot laser has an amplitude oscillation condition that varies with the complex valued reflectivity of the ring mirror, such that the intensity of the Fabry Perot laser at the output of the ring mirror varies in relation to the rotation rate of the frame of the RMORS. In one embodiment, the direction of rotation can be detected using a phase modulator on one or both arms of the RMORS. The phase modulator may be, for example, a Micro-Electro-Mechanical Systems (MEMS) phase modulator that includes a moveable corner mirror coupled to a MEMS actuator.

Figure 1:
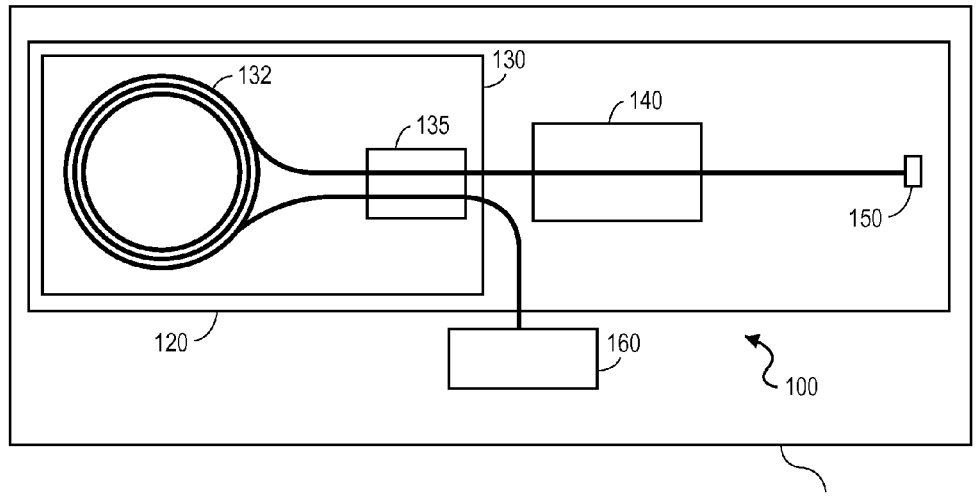
FIG. 1 is a schematic block diagram illustrating an exemplary configuration of an optical rotation sensor, in accordance with embodiments of the present invention.

Referring now to FIG. 1, there is illustrated an exemplary RMORS 100 within a frame 110, in accordance with embodiments of the present invention. The RMORS 100 includes a Fabry Perot laser 120 and a detector 160. The Fabry Perot laser 120 includes an active gain medium 140 within a closed optical path and mirrors 130 and 150 at respective ends of the closed optical path. By way of example, but not limitation, the active gain medium 140 can include a semiconductor optical amplifier, erbium doped fiber amplifier or waveguide optical amplifier. In addition, more than one active gain medium 140 may be used to increase the generated optical power. The active gain medium 140 may also be coated with an AR coating to minimize the reflection loss in the RMORS 100 and avoid perturbing the resonance of the RMORS 100.

The active gain medium 140, together with mirrors 130 and 150 collectively form a closed optical path in free space, using mirrors 130 and 150 for optical beam guiding. Mirror 150 is a fully or a partially reflective mirror that has a fixed reflectivity. For example, mirror 150 may include a high reflection mirror, metallic mirror, a coated end of a waveguide or fiber (as shown in FIG. 1) and/or any other type of mirror. Mirror 130 is a ring mirror 130 that has a complex valued reflectivity whose magnitude varies with the rotation rate of the frame 110, according to the Sagnac effect.

In one embodiment, as shown in FIG. 1, the ring mirror 130 includes a waveguide loop 132 (e.g., a fiber loop) and an optical coupler 135 connected with the two ends of the waveguide loop 132. By way of example, but not limitation, the optical coupler 135 may include a 50/50 coupler, a different ratio coupler or other type of optical directional coupler. The waveguide loop 132 is, for example, a single mode (SM) fiber coil, a polarization maintaining fiber coil, an integrated optical coil or any other type of optical ring. In embodiments in which the waveguide loop 132 is a polarization maintaining fiber coil, the polarization coupling effects of the fiber, and therefore, the phase bias can be reduced to enable detection of very low rotation rates. Such a configuration of the RMORS 100 provides a high rotation sensitivity with minimal to no lock-in problems.

The complex valued reflectivity of the ring mirror 130 shown in FIG. 1 has a phase that is dependent upon the length of the fiber loop 132 and an amplitude that is dependent upon the rotation rate of the frame 110. Thus, the reflectivity R and transmission T of the ring mirror 130 are given by:

$$R = \cos^2(\phi)e^{-jKL} \qquad \text{(Equation 1)}$$

$$T = \sin^2(\phi)e^{-jKL} \qquad \text{(Equation 2)}$$

where $$\phi = \frac{\pi DL}{\lambda c}\Omega \quad \text{(Equation 3)}$$

and where D is the diameter of the fiber coil, L is the length of the fiber, λ is the wavelength of the beam propagating in the fiber, c is the speed of light in free space, φ is the Sagnac phase shift and Ω is the rotation rate of the frame 110 of the RMORS 100.

In an exemplary operation, the active gain medium 140 generates first and second light beams leading to a clockwise (CW) light beam and a counter-clockwise (CCW) light beam that counter-propagate (e.g., propagate in opposite directions) through the waveguide loop 132. Upon rotating the frame in which the RMORS 100 is fixed, the reflectivity of the ring minor 130 varies and sets a new amplitude oscillation condition for the Fabry Perot laser 120 due to the modification in the reflectivity of the ring mirror 130 with the rotation rate. Therefore, the intensity of the Fabry Perot laser 120 varies in relation to the rotation rate Ω of the frame 110.

The output signal at an output of the Fabry Perot laser 120 is measured by the detector 160. The detector 160 may be coupled to an output at any point within the closed optical path. In FIG. 1, the detector 160 is shown coupled to an output of the ring minor 130 via optical coupler 135. However, in other embodiments, the detector 160 may be coupled to an output of the second mirror 150. For example, in an exemplary embodiment, detector 160 may be coupled to the coated fiber or high reflection second minor 150 if the reflectivity of the second minor 150 is less than 100%.

In a further exemplary operation of the embodiment shown in FIG. 1, ring mirror 130 directs the CW and CCW beams towards detector 160 through the optical coupler 135 and enables an interference pattern to be created thereon. In this embodiment, the detector 160 is a photo detector capable of detecting the interference pattern and generating an output signal indicative thereof. From the measured output signal, the rotation rate Ω can be directly obtained by subsequent processing of the output signal. For example, a processor (not shown) can receive the measured output signal (corresponding to the interference pattern) from the detector 160 and perform a spectrum analysis of the interference pattern, with knowledge of the induced phase modulation, to determine the angular rate of rotation Ω of the RMORS 100. In other embodiments, a feedback loop can be added between the control voltage of the phase modulator 138 and the detector 160, and the rotation rate Ω can be read from the feedback loop by nulling the Sagnac phase shift due to the rotation rate.

The processor (not shown) may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Figure 2:
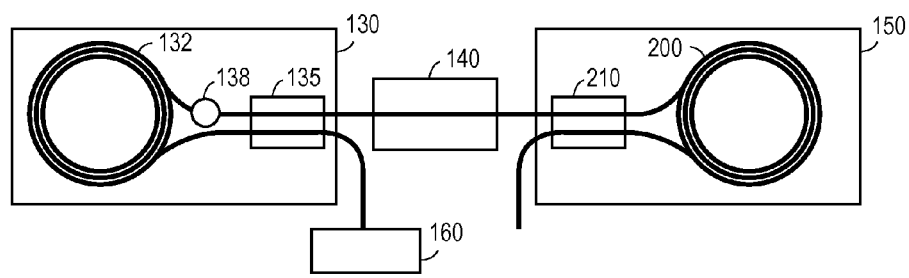
FIG. 2 is a schematic block diagram illustrating another exemplary configuration of an optical rotation sensor, in accordance with embodiments of the present invention.

FIG. 2 illustrates another exemplary configuration of an RMORS, in accordance with embodiments of the present invention. In FIG. 2, mirror 150 is an additional ring minor that includes an additional fiber loop 200 and an additional optical coupler 210 coupled to the two ends of the additional fiber loop 200. Thus, the Fabry Perot cavity is formed between the two ring mirrors 130 and 150, with the output signal being measured by detector 160 at the output of ring mirror 130. In other embodiments, the detector 160 may be placed at the output of the second ring mirror 150 (i.e., at the output of optical coupler 210) or two detectors may be used, each for measuring an output signal from a respective one of the ring mirrors 130 and 150.

Figure 3:
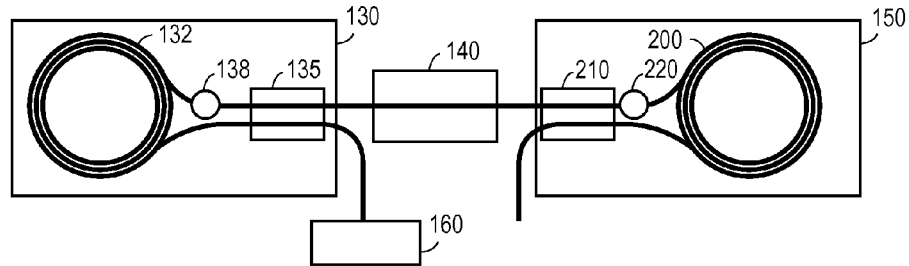
FIG. 3 is a schematic block diagram of yet another exemplary configuration of an optical rotation sensor, in accordance with embodiments of the present invention.

In FIG. 2, a phase modulator 138 is also included in the first ring mirror 130 to obtain the desired phase control for maximum sensitivity and to detect the direction of rotation of the RMORS 100. In other embodiments, as shown in FIG. 3, two phase modulators 138 and 220, one in each of the ring mirrors 130 and 150, may be used to increase the sensitivity in detecting the rotation of the RMORS 100.

Figure 4:
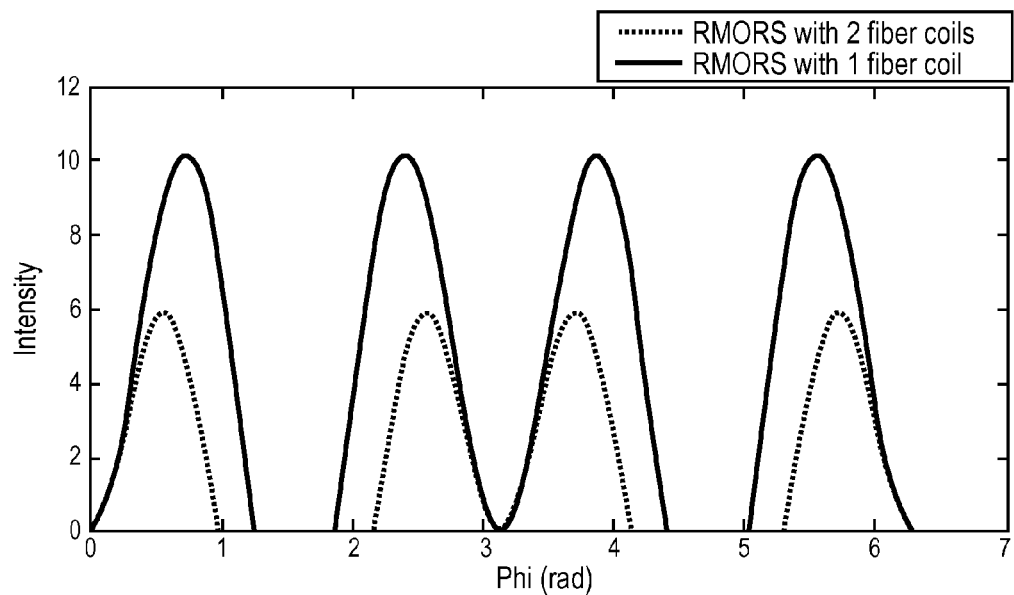
FIG. 4 is a diagram illustrating exemplary intensities of the output of the optical rotation sensor with respect to the phase shift between the clock wise and counter clock wise signals in the closed optical path.

FIG. 4 is a diagram illustrating exemplary intensities of the output of the RMORS with respect to the rotation rate. In FIG. 4, the intensity is given for a RMORS with one ring mirror, as shown in FIG. 1, and two minors, as shown in FIGS. 2 and 3.

The intensity ($I_d$) for a RMORS with a single ring mirror and a gain ($G_0$), as shown in FIG. 1, is given by:

$$I_d = \frac{1}{2}I_{sat}\sin^2(\phi_s)(R_1 G_0 \cos^2(\phi_s) - 1) \quad \text{(Equation 4)}$$

The intensity ($I_d$) for a RMORS with two ring minors and a gain ($G_0$), as shown in FIGS. 2 and 3, is given by:

$$I_d = \frac{1}{2}I_{sat}\sin^2(\phi_s)(R_1 G_0 \cos^4(\phi_s) - 1) \quad \text{(Equation 5)}$$

Figure 5:
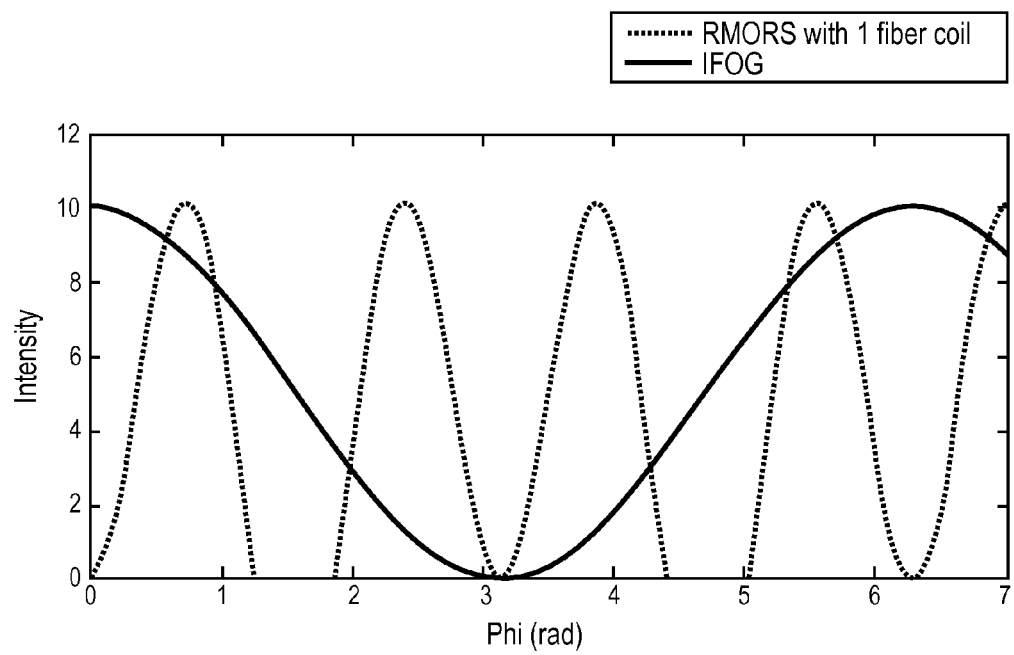
FIGS. 5 and 6 are diagrams illustrating exemplary intensities of the output of the optical rotation sensor as compared with a traditional interferometric fiber optical gyroscope.
Figure 6:
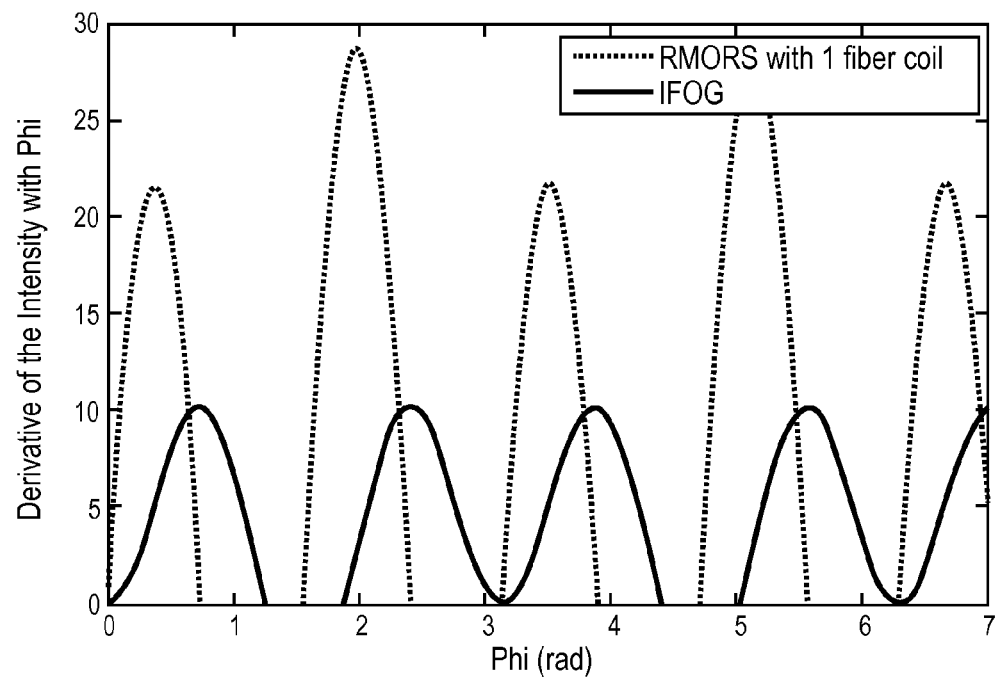

FIGS. 5 and 6 are diagrams illustrating the exemplary intensity of the output of the RMORS with a single ring mirror as compared with a traditional interferometric fiber optical gyroscope (IFOG). As can be seen in FIGS. 5 and 6, the sensitivity of the RMORS is greatly enhanced over that of the traditional IFOG. For example, for a gain of 20 dB, the RMORS provides a 25% sensitivity enhancement over that of the traditional IFOG.

Figure 7:
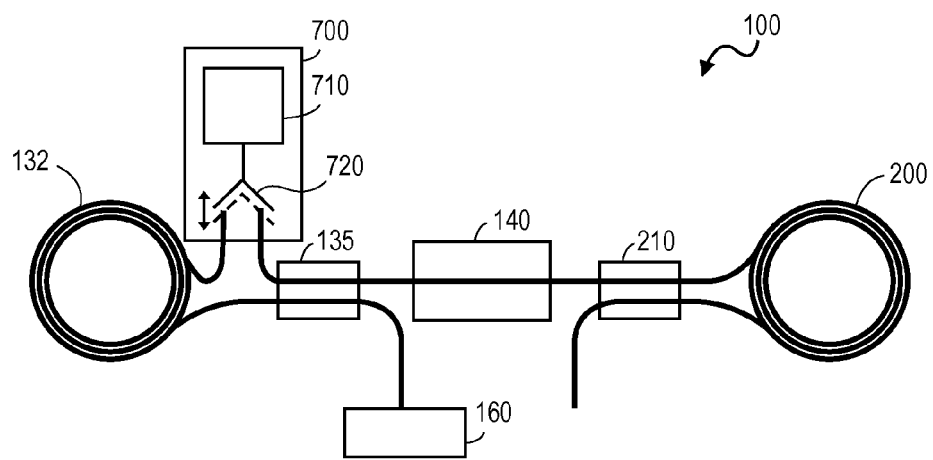
FIG. 7 is a schematic block diagram illustrating still another exemplary configuration of an optical rotation sensor, in accordance with embodiments of the present invention.

FIG. 7 is a schematic block diagram illustrating still another exemplary configuration of the RMORS, in accordance with embodiments of the present invention. In FIG. 7, a corner mirror 720 formed on a Micro Electro-Mechanical Systems (MEMS) die 700 operates as a phase modulator in a RMORS 100 having two ring minors. The corner minor 720 is coupled to a MEMS actuator 710 on the MEMS die 700. The MEMS actuator 710 operates to move corner mirror 720, thereby inducing a phase modulation on the CW and CCW beams relative to one another as the CW and CCW beams are reflected off one side of the corner minor 720 towards the other side of corner minor 720.

In an exemplary embodiment, the MEMS actuator 710 is an electrostatic actuator, such as a comb drive actuator, parallel plate actuator or other type of electrostatic actuator. The corner mirror 720 is coupled to MEMS actuator 710, such that motion of the MEMS actuator 710 causes a displacement in the position of mirror 720.

Figure 8:
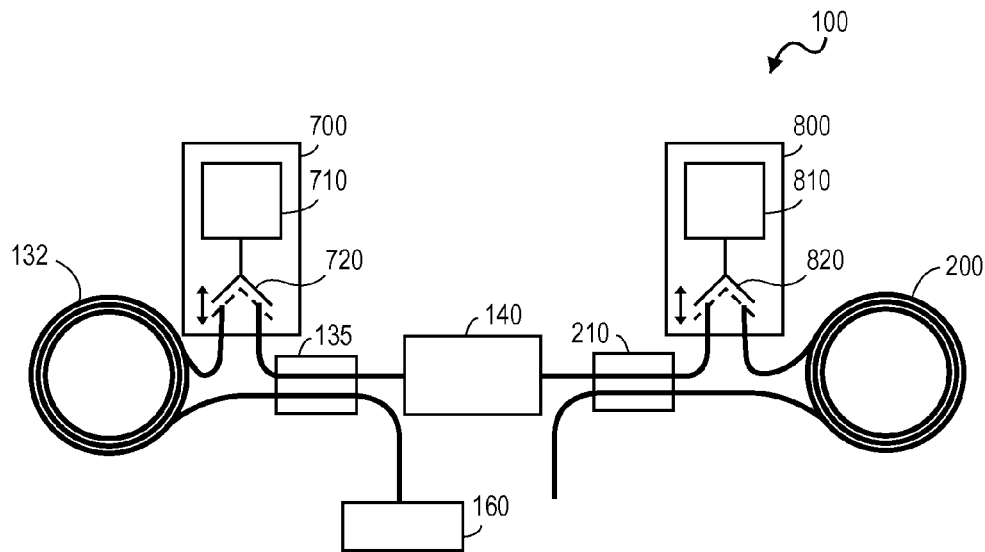
FIG. 8 is a schematic block diagram illustrating a further exemplary configuration of an optical rotation sensor, in accordance with embodiments of the present invention.

In FIG. 7, a single corner mirror 720 is used to detect the direction of rotation of the RMORS 100 and control its sensitivity. In other embodiments, as shown in FIG. 8, two corner mirrors 720 and 820, each fabricated on a respective MEMS die 700 and 800, may be used to increase the sensitivity in detecting the rotation of the RMORS 100. Each of the corner minors 720 and 820 is further coupled to a respective MEMS actuator 710 and 810 to induce respective phases on the CW and CCW beams propagating in the closed optical path. The MEMS actuators 710 and 810 may operate to move the corner minors 720 and 820 in the same direction or in opposite directions and may operate to move the corner minors 720 and 820 the same distance or different distances.

Figure 9:
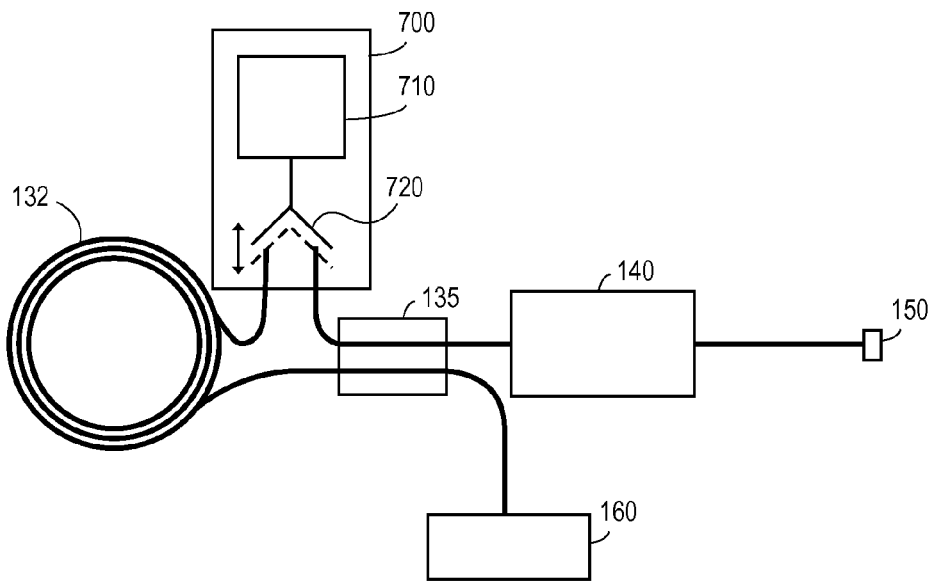
FIG. 9 is a schematic block diagram illustrating still a further exemplary configuration of an optical rotation sensor, in accordance with embodiments of the present invention.

In another embodiment, as shown in FIG. 9, the MEMS-based phase modulator 700-720 can also be used in a RMORS with a single ring mirror and flat second minor 150 to create the desired phase control for use in detecting the direction of rotation of the RMORS and maximizing its sensitivity.

Figure 10:
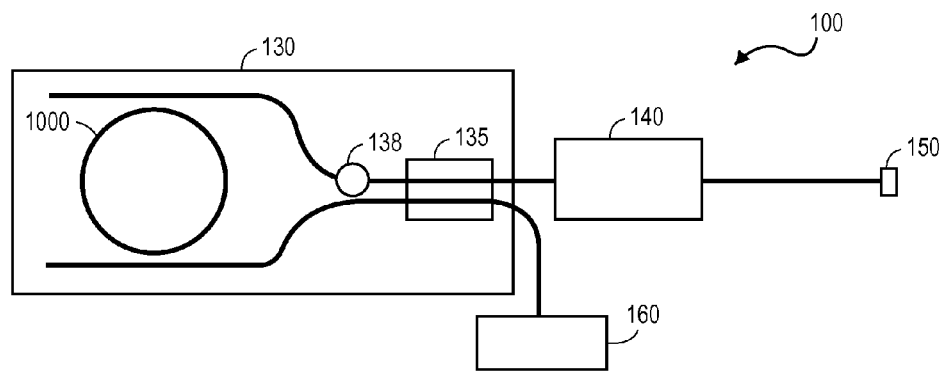
FIG. 10 is a schematic block diagram illustrating an exemplary configuration of an optical rotation sensor with a ring resonator, in accordance with the present invention.
Figure 11:
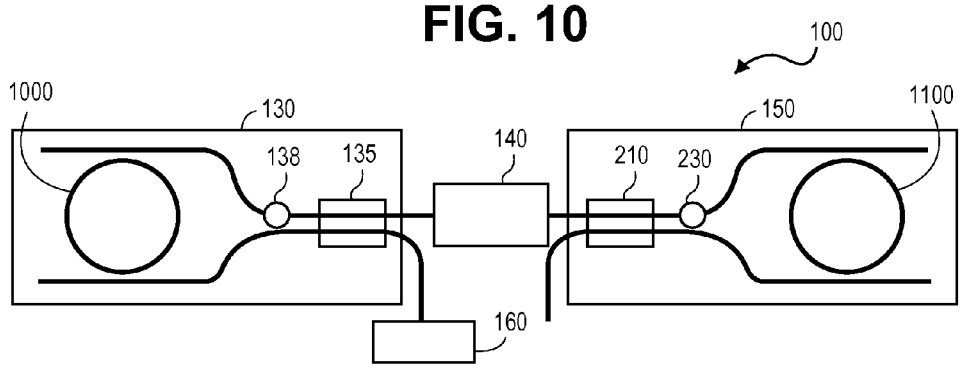
FIG. 11 is a schematic block diagram illustrating another exemplary configuration of an optical rotation sensor with a ring resonator, in accordance with embodiments of the present invention.

FIG. 10 illustrates another exemplary configuration of a RMORS 100, in accordance with embodiments of the present invention. In FIG. 10, the ring minor 130 is formed using a ring resonator 1000 with infinite turns of light instead of a fiber coil. Such a configuration of the ring minor 130 provides increased sensitivity with reduced fiber length as compared with a fiber coil. The RMORS 100 can include a single ring resonator 1000, as shown in FIG. 10, or two ring resonators 1000 and 1100, as shown in FIG. 11.

The RMORS 100 can be integrated using an all integrated optics technology or any other configuration, such as Free Space, waveguides and/or IO-MEMS compatible technology. For example, the RMORS configuration of FIG. 11 can be fabricated using integrated optics technology to enable a small, single chip RMORS device to be produced.

Figure 12:
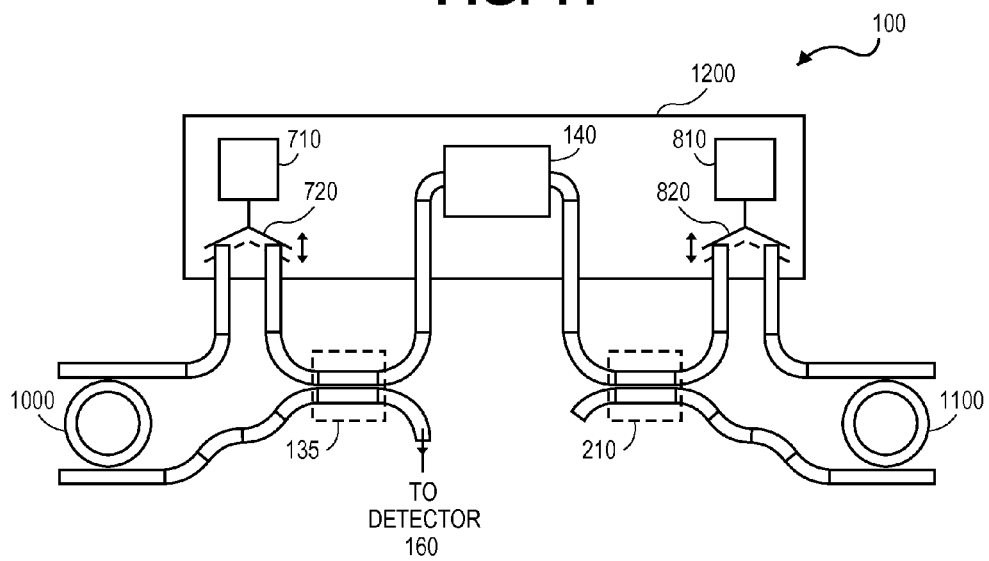
FIG. 12 is a schematic block diagram illustrating an exemplary configuration of an integrated optical rotation sensor, in accordance with embodiments of the present invention.

In an exemplary embodiment, as shown in FIG. 12, the MEMS actuators 710 and 810, corner minors 720 and 820 and gain medium 140 can be fabricated using MEMS technology, which allows the RMORS 100 to have an integrated form. For example, the corner mirrors 720 and 820 and MEMS actuators 710 and 810 can be monolithically fabricated by an etching technology, such as a Deep Reactive-Ion Etching (DRIE) process, and self-aligned by a lithography alignment process on a wafer/substrate 1200, such as a Silicon on Insulator (SOI) wafer/substrate, a GaAs wafer/substrate or any other semiconductor or dielectric wafer/substrate.

The gain medium 140 may be inserted into a groove also fabricated in the same production step as the corner mirrors 720 and 820 and actuators 710 and 820 by the DRIE process to ensure alignment of the gain medium 140 with the corner mirrors 720 and 820. In another embodiment, one or more of the corner minors 720 and 820 may be fabricated by selective deposition on the wafer/substrate 1200.

Figure 13:
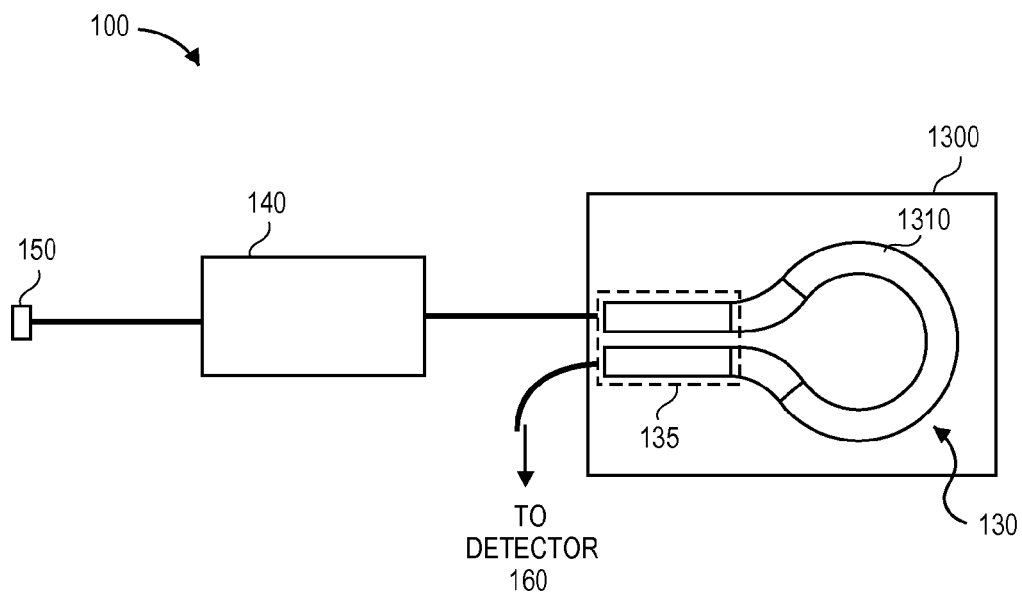
FIG. 13 is a schematic block diagram illustrating another exemplary configuration of an integrated optical rotation sensor, in accordance with embodiments of the present invention.

FIG. 13 is a schematic block diagram illustrating another exemplary configuration of an integrated optical rotation sensor, in accordance with embodiments of the present invention. In FIG. 13, the RMORS 100 includes a single substrate 1300 having the ring minor 130 thereon. Thus, in FIG. 13, the ring mirror 130 is an integrated optical ring minor that includes an integrated optical waveguide loop 1310 and an integrated optical coupler 135.

Figure 14:
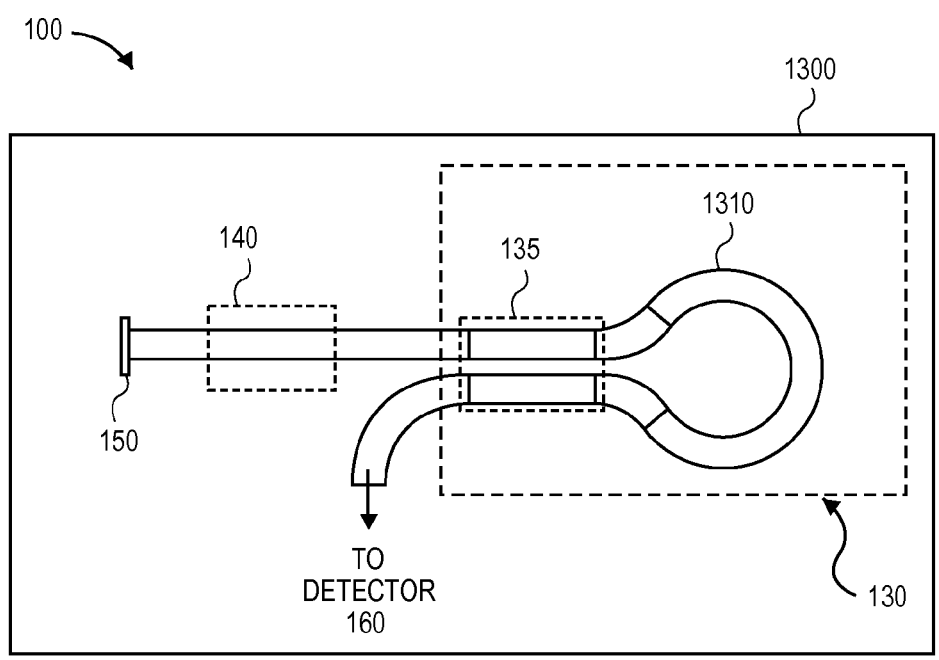
FIG. 14 is a schematic block diagram illustrating yet another exemplary configuration of an integrated optical rotation sensor, in accordance with embodiments of the present invention.

In other embodiments, as shown in FIG. 14, the RMORS 100 may be fully integrated such that the single substrate 1300 has the integrated optical ring mirror 130, the active gain medium 140 and the second minor 150 thereon. In an exemplary embodiment, the active gain medium 140 is a waveguide amplifier and the second mirror 150 is a metallized end of a waveguide or a dielectric mirror coupled to the waveguide amplifier 140.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An optical rotation sensor, comprising:
   a Fabry Perot laser including:
   an active gain medium for generating first and second light beams;
   a closed optical path through which the first and second light beams counter-propagate, the active gain medium being within the closed optical path;
   first and second mirrors coupled to respective ends of the closed optical path, each of the first and second mirrors being ring mirrors, the first ring mirror having a complex valued reflectivity that varies with a rotation rate of a frame within which the optical rotation sensor is placed; and
   a detector coupled to an output of the Fabry Perot laser to measure an output intensity thereof.

2. The optical rotation sensor of claim 1, wherein the first ring mirror further includes:
   a waveguide loop having two ends; and
   an optical coupler having a first side coupled to the two ends of the waveguide loop, the optical coupler further having a second side coupled to the active gain medium and the detector.

3. The optical rotation sensor of claim 2, wherein:
   the complex valued reflectivity of the first ring mirror has a phase that is dependent upon a length of the waveguide loop and an amplitude that is dependent upon the rotation rate of the frame.

4. The optical rotation sensor of claim 2, wherein:
   the intensity of the Fabry Perot laser at the output of the first ring mirror varies in relation to the rotation rate.

5. The optical rotation sensor of claim 2, wherein the waveguide loop is a fiber loop.

6. The optical rotation sensor of claim 5, wherein the fiber loop includes a single mode fiber coil or a polarization maintaining fiber coil.

7. The optical rotation sensor of claim 2, wherein the first ring mirror is an integrated optical ring mirror, the waveguide loop is an integrated optical waveguide loop and the optical coupler is an integrated optical coupler, and further comprising:
   a single substrate having the integrated optical ring mirror including the integrated optical waveguide and the integrated optical coupler thereon.

8. The optical rotation sensor of claim 7, wherein:
   the active gain medium includes a waveguide amplifier; and
   the single substrate has the integrated optical ring mirror, the waveguide amplifier and the waveguide thereon.

9. The optical rotation sensor of claim 2, wherein the first ring mirror further includes:
   a phase modulator coupled between one of the two ends of the waveguide loop and the optical coupler.

10. The optical rotation sensor of claim 9, wherein the phase modulator includes:
    a moveable corner mirror; and
    a Micro-Electro-Mechanical Systems (MEMS) actuator coupled to the moveable corner mirror to cause a respective displacement thereof that induces a phase modulation on the first and second light beams relative to one another.

11. The optical rotation sensor of claim 2, wherein the second ring mirror includes:
   a second waveguide loop having two ends; and
   a second optical coupler having a first side coupled to the two ends of the second waveguide loop, the second optical coupler further having a second side coupled to the active gain medium.

12. The optical rotation sensor of claim 11, wherein the second ring mirror further includes:
   a second phase modulator coupled between one of the two ends of the second waveguide loop and the second optical coupler.

13. The optical rotation sensor of claim 12, wherein the second phase modulator includes:
   a second moveable corner mirror; and
   a second Micro-Electro-Mechanical Systems (MEMS) actuator coupled to the second moveable corner mirror to cause a respective displacement thereof that induces a phase modulation on the first and second light beams relative to one another.

14. The optical rotation sensor of claim 1, wherein the first ring mirror includes:
   a ring resonator having two ends; and
   an optical coupler having a first side coupled to the two ends of the ring resonator, the optical coupler having a second side coupled to the active gain medium and the detector.

15. The optical rotation sensor of claim 14, wherein the first ring mirror further includes:
   a phase modulator coupled between one of the two ends of the ring resonator and the optical coupler.

16. The optical rotation sensor of claim 15, wherein the phase modulator includes:
   a first moveable corner mirror; and
   a first Micro-Electro-Mechanical Systems (MEMS) actuator coupled to the first moveable corner mirror to cause a respective displacement thereof that induces a phase modulation on the first and second light beams relative to one another.

17. The optical rotation sensor of claim 16, wherein the second ring mirror includes:
   a second ring resonator having two ends; and
   a second optical coupler having a first side coupled to the two ends of the second ring resonator, the second optical coupler further having a second side coupled to the active gain medium.

18. The optical rotation sensor of claim 17, wherein the second ring mirror further includes:
   a second phase modulator coupled between one of the two ends of the second ring resonator and the second optical coupler.

19. The optical rotation sensor of claim 18, wherein the second phase modulator includes:
   a second corner mirror; and
   a second Micro-Electro-Mechanical Systems (MEMS) actuator coupled to the second corner mirror to cause a respective displacement thereof that induces a phase modulation on the first and second light beams relative to one another.

20. The optical rotation sensor of claim 19, further comprising:
   a MEMS die including the first corner mirror, the first MEMS actuator, the active gain medium, the second corner mirror and the second MEMS actuator.

21. The optical rotation sensor of claim 1, wherein the active gain medium includes a semiconductor optical amplifier, a fiber amplifier or a waveguide optical amplifier.

* * * * *